Nov. 11, 1947.  S. S. GRADY  2,430,465

BUS BAR MOUNTED AMMETER

Filed July 21, 1945

INVENTOR
STEPHEN S. GRADY
BY
ATTORNEY

Patented Nov. 11, 1947

2,430,465

UNITED STATES PATENT OFFICE 2,430,465

BUS BAR MOUNTED AMMETER

Stephen S. Grady, New York, N. Y.

Application July 21, 1945, Serial No. 606,368

7 Claims. (Cl. 171—95)

This invention relates to ammeters and more especially to indicators for registering or indicating the current passing through a given conductor.

The conventional ammeters today in use generally require a transformer in association with the same. To this end, it is an object of the present invention to provide an ammeter that may dispense with a transformer and thus reduce not only the cost of materials necessary but also make possible a material saving in labor.

It is still another object of the present invention to provide an ammeter that can be readily attached to a bus bar, conductor or the like previously installed by simply attaching the same to the bus bar or conductor by any simple connecting means, such as a screw clip or the like.

Furthermore, it is an object of the present invention to provide an improved ammeter that can be readily connected either to the bus bar or conductor or to a connecting bar or conductor which connects two separated bus bars or conductors.

These and other features, capabilities and advantages of the invention will appear from the subjoined detail description of specific embodiments thereof illustrated in the accompanying drawings, in which Fig. 1 is a front elevation of one form of indicator in place;

Figure 1:
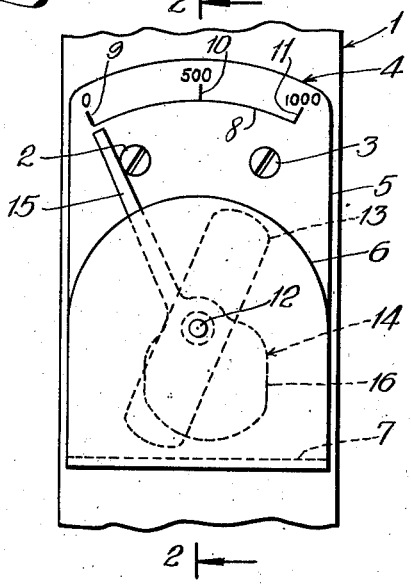
Figure 2:
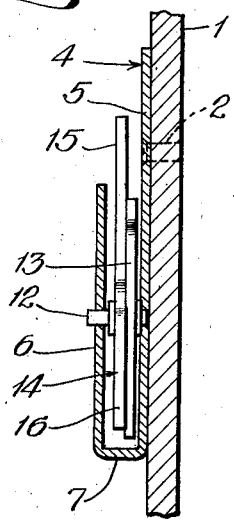
Fig. 2 is a section on the line 2—2 of Fig. 1.

In the embodiment shown in Figs. 1 and 2, there is illustrated a bus bar 1 as exemplifying the conductor through which the current to be measured is passing. On this bar 1, there is connected by two screws 2 and 3 the plate 4 composed of brass or the like. The plate 4 in the present embodiment has a main section 5 and an auxiliary section 6 extending parallel to the section 5 but spaced therefrom by the web 7. The section 6 is shorter than the section 5 to afford access to the screws 2 and 3 and also to provide an area for the graduation marks consisting in the present instance of the arcuate line 8 having only three graduations 9, 10 and 11, which are inscribed on the section 5 and consist of the notations "0," "500" and "1000" respectively.

The arcuate line 8 is predetermined to aline with an arc concentric to the pivot pin 12 extending through the sections 5 and 6 and journalled to rotate freely in said sections 5 and 6, the pivot pin 12 having fixed thereon the iron bar 13 composed as an instance of soft iron responsive to magnetic lines of force that are generated in the current passing through the bus bar 1.

The iron bar 13 is secured to the plate 14 composed of copper, zinc or the like material, not readily responsive to the magnetic lines of force generated by the current passing through the bar 1. The shape of the plate 14 is important. In the present instance, it has a finger 15 serving as an indicating arm to cooperate with the graduations 9 to 11 inclusive and the enlargement 16 serving as a ballast to balance the device so that the iron bar 13 will be inclined to the vertical. This device is particularly useful when the bus bar 1 or conductor is extending vertically and the pivot pin 12 is substantially horizontal so that, responsive to gravity, when no current is passing through the conductor 1, the bar 13 will extend about 80° to the horizontal and the indicating finger 15 then registers with the graduation 9 at "0."

The device takes advantage of the phenomenon that the current passing through the bar 1 will deflect the bar 13 into a neutral or horizontal position and the ballast is so determined that it will counteract this tendency depending upon the current passing through the bar 1, so that it will deflect the bar 13, so that the finger 15 will register with the graduation 10, the "500" notation, when a current of 500 amperes is transmitted, and register with the graduation 11 or the "1000" notation when a current of 1000 amperes is transmitted. In turn, if the current is less than 500 amperes, the finger 15 will register somewhere between the graduations 9 and 10, and if the current is between 500 and 1000 amperes, it will register somewhere between the graduations 10 and 11 depending upon the strength of the current.

Figure 3:
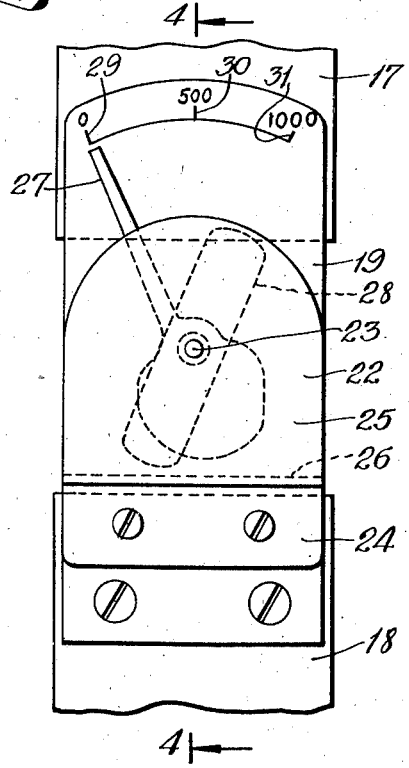
Fig. 3 is a front elevation of another embodiment of the indicator in place.
Figure 4:
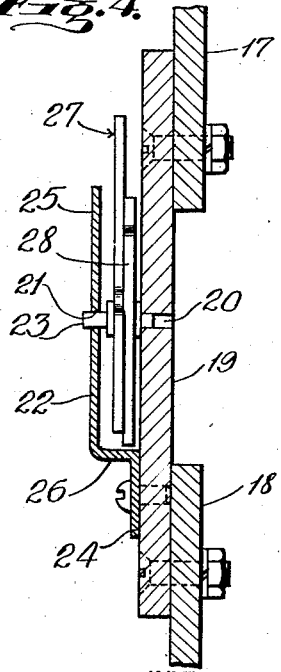
Fig. 4 is a section on the line 4—4 of Fig. 3.

If it is desirous to connect the indicator between the opposing ends of a break in the current, the embodiment shown in Figs. 3 and 4 may be used to advantage. In this embodiment, the bars 17 and 18 are the opposing ends of the main conductor through which the current to be measured is passing. In such case, a bar 19 of current conducting material similar to that of the bars 17 and 18 is connected to the bars 17 and 18 by any suitable means such as screws or the like. The bar 19 in this case preferably has a centrally disposed opening 20 in alinement with the opening 21 in the plate 22 to receive the pivot pin 23. The plate 22 may be composed of brass as is the case with the plate 4 of the first embodiment, but in this instance has a flange 24 which is connected to the bar 19 and also has a main supporting section 25 spaced from and extending parallel to the bar 19, being connected to the flange 24 by the web 26, the section 25, flange 24 and web 26 all being integral with one another.

The pin 23 in this embodiment rotates freely in the openings 20 and 21 and has fixed thereon an indicating finger 27 and a current responsive medium such as the iron bar 28 similar to the plate 14 and the iron bar 13 respectively of the first embodiment. In this embodiment, the graduations, however, are formed on the bar 19, see the graduations 29, 30 and 31 similar to the graduations 9, 10 and 11 of the first embodiment.

While the specific embodiment of the ammeter or current indicator is here described and illustrated as sensitive to gravity and particularly adapted for a vertically extending conductor, it is of course obvious that in place of gravity, any number of mechanical control means such as springs and the like can be used to position the iron bar 28 at an angle to the conductor through which the current is passing even though such conductor were disposed in a horizontal plane, and in turn, even though such conductor were mounted on a sea-going vessel or airplane where the angle of the conductor may change from time to time relative to gravity, without departing from the general spirit of the invention.

It is obvious that various changes and modifications may be made to the details of construction without departing from the general spirit of the invention as set forth in the appended claims.

I claim:

1. An ammeter or current indicator adapted to be positioned adjacent to an upright current conductor to measure the current flow therein comprising a vertically extending support, an indicator plate, a current responsive bar fixed at its middle to said plate and pivotally connected to said support to oscillate about a horizontal axis, said bar in length approximating the width of the upright conductor, said plate having a ballast responsive to gravity normally to maintain said bar inclined to the vertical but freely rotatable about its axis to enable the magnetic lines of force of current in the conductor to deflect said bar when the axis of said plate is disposed adjacent the middle of the conductor.

2. An ammeter or current indicator adapted to be positioned adjacent to an upright current conductor to measure the current flow therein comprising a vertically extending support, an indicator plate, a current responsive bar fixed at its middle to said plate and pivotally connected to said support to oscillate about a horizontal axis, said bar in length approximating the width of the upright conductor, said plate having a ballast responsive to gravity normally to maintain said bar inclined to the vertical but freely rotatable about its axis to enable the magnetic lines of force of current in the conductor to deflect said bar, graduations associated with said support, said plate having a finger cooperating with said graduations to indicate the strength of current passing through the conductor when the pivotal axis of said plate is disposed adjacent the middle of the conductor.

3. An ammeter adapted to be positioned adjacent to a vertically extending current conductor to measure the current flow therein comprising a supporting plate having a vertically extending main section, an auxiliary section extending parallel to said main section, and a web connecting said main section to said auxiliary section and spacing the sections from one another, a horizontally extending pivot pin journalled in said sections, an indicator plate, a current responsive bar fixed at its middle to said plate and mounted on said pin to oscillate about a horizontal axis, said bar in length corresponding substantially to the width of the upright conductor, said indicator plate being formed to include a ballast responsive to gravity normally to maintain said bar inclined to the vertical but freely rotatable about its axis to enable the magnetic lines of force of the current in the conductor to deflect said bar, said main section having graduations, said plate having a finger cooperating with said graduations to indicate the strength of current passing through the conductor when the pivotal axis of said plate is disposed adjacent the middle of the conductor.

4. An ammeter or current indicator adapted to be positioned adjacent to an upright current conductor to measure the current flow therein comprising a vertically extending support, an indicator plate, a current responsive bar fixed to said plate and pivotally connected at its middle to said support to oscillate about a horizontal axis, said bar in length corresponding to the width of the upright conductor, said plate having a ballast responsive to gravity normally to maintain said bar inclined to the vertical but freely rotatable about its axis to enable the magnetic lines of force of the current in the conductor to deflect said bar, graduations on said support, said plate having a finger cooperating with said graduations to indicate the strength of current passing through the conductor when the pivotal axis of said plate is disposed adjacent the middle of the conductor.

5. The combination of a vertically extending current conductor, an ammeter comprising a support secured to the conductor, an indicator plate, a current responsive bar fixed to said indicator plate and pivotally connected at its middle to said support to oscillate about a horizontal axis, said bar in length corresponding substantially to the width of said upright conductor, said plate having a ballast responsive to gravity normally to maintain said bar inclined to the vertical but freely rotatable about its axis to enable the magnetic lines of force of current in the conductor to deflect said bar when the axis of said plate is disposed adjacent the middle of the conductor.

6. The combination of a vertically extending current conductor, an ammeter comprising a support secured to the conductor, an indicator plate, a current responsive bar fixed to said indicator plate and pivotally connected at its middle to said support to oscillate about a horizontal axis, said bar in length corresponding substantially to the width of said upright conductor, said plate having a ballast responsive to gravity normally to maintain said bar inclined to the vertical but freely rotatable about its axis to enable the magnetic lines of force of current in the conductor to deflect said bar when the axis of said plate is disposed adjacent the middle of the conductor, graduations on said conductor, said plate having a finger cooperating with said graduations to indicate the strength of current passing through the conductor.

7. The combination of a vertically extending current conductor, an ammeter comprising a supporting plate having a vertically extending main section, an auxiliary section extending parallel to said main section, and a weight connecting said main section to said auxiliary section and spacing the sections from one another, a horizontally extending pivot pin journalled in said sections, an indicator plate, a current responsive bar fixed to said plate and mounted at its middle on said pin to oscillate about a horizontal axis, said bar in length corresponding substantially to the width of said upright conductor, said indicator plate being formed to include a ballast responsive to gravity normally to maintain said bar inclined to the vertical but freely rotatable about its axis to enable the magnetic lines of force of the current in the conductor to deflect said bar, said main section having graduations thereon, said plate having a finger cooperating with said graduations to indicate the strength of current passing through the conductor when the axis of said plate is disposed adjacent the middle of the conductor.

STEPHEN S. GRADY.

REFERENCES CITED

The following references are of record in the file of this patent:

UNITED STATES PATENTS

| Number | Name | Date |
|---|---|---|
| 1,876,483 | Adams | Sept. 6, 1932 |
| 434,558 | Eickemeyer | Aug. 19, 1890 |
| 434,557 | Eickemeyer | Aug. 19, 1890 |